US012735350B2

(12) United States Patent
Tang et al.

(10) Patent No.: US 12,735,350 B2
(45) Date of Patent: Sep. 15, 2026

(54) GLASS-CERAMIC DENTAL PROSTHESIS AND METHOD FOR PREPARING THE SAME, METHOD FOR REINFORCING GLASS OR GLASS-CERAMICS, AND ALKALINE REINFORCING PASTE

(71) Applicant: Fuzhou Rick Brown Biomaterials Co., Ltd., Fuzhou (CN)

(72) Inventors: Zhongzhi Tang, Fuzhou (CN); Honglin Liu, Fuzhou (CN)

(73) Assignee: Fuzhou Rick Brown Biomaterials Co., Ltd., Fuzhou (CN)

( * ) Notice: Subject to any disclaimer, the term of this patent is extended or adjusted under 35 U.S.C. 154(b) by 445 days.

(21) Appl. No.: 18/205,066

(22) Filed: Jun. 2, 2023

(65) Prior Publication Data

US 2024/0083810 A1 Mar. 14, 2024

(30) Foreign Application Priority Data

Sep. 9, 2022 (CN) ......................... 202211105740.2
Sep. 9, 2022 (CN) ......................... 202211105771.8

(51) Int. Cl.

| | |
|---|---|
| ***C03C 21/00*** | (2006.01) |
| ***A61C 13/083*** | (2006.01) |
| ***C03C 4/00*** | (2006.01) |
| ***C03C 10/00*** | (2006.01) |
| ***C03C 17/02*** | (2006.01) |

(52) U.S. Cl.

CPC .......... *C03C 21/002* (2013.01); *A61C 13/083* (2013.01); *C03C 4/0021* (2013.01); (Continued)

(58) Field of Classification Search

None

See application file for complete search history.

(56) References Cited

U.S. PATENT DOCUMENTS 4,546,006 A 10/1985 Ohno et al.
10,745,319 B2 8/2020 Pröpster et al.
(Continued)

FOREIGN PATENT DOCUMENTS

CN 107531558 A 1/2018
CN 107601922 A 1/2018
(Continued)

OTHER PUBLICATIONS

Zhang et al., "Phase Equilibrium of NaN03/KN03 in Glycerol + H20 Mixed Solvent System at 288. 15 K and 298.15 K", Kemija U Industriji, vol. 63, No. 9-10, pp. 345-354, Sep. 1, 2014. (10 pages).
(Continued)

*Primary Examiner* — Elizabeth Collister
(74) *Attorney, Agent, or Firm* — Kagan Binder, PLLC

(57) ABSTRACT

The present disclosure relates to a glass-ceramic dental prosthesis and a method for preparing the same. The glass-ceramic dental prosthesis has a metal ion-reinforced surface. An area of the metal ion-reinforced surface is smaller than an entire surface area of the glass-ceramic dental prosthesis. A concentration of a reinforcing metal ion on the metal ion-reinforced surface is $C_1$%. A concentration of the reinforcing metal ion on an other surface region of the glass-ceramic dental prosthesis is $C_2$%. $C_1$ is greater than $C_2$.

9 Claims, 6 Drawing Sheets

(52) U.S. Cl.
CPC .............. *C03C 10/00* (2013.01); *C03C 17/02* (2013.01); *C03C 2204/00* (2013.01); *C03C 2218/32* (2013.01)

(56) References Cited

U.S. PATENT DOCUMENTS

| | | | | |
|---|---|---|---|---|
| 11,040,909 | B2 | 6/2021 | Völkl et al. | |
| 11,370,702 | B2 | 6/2022 | Fecher et al. | |
| 2016/0229742 | A1 | 8/2016 | Wondraczek et al. | |
| 2016/0340238 | A1* | 11/2016 | Völkl | A61K 6/804 |

FOREIGN PATENT DOCUMENTS

| | | | |
|---|---|---|---|
| CN | 107847399 | A | 3/2018 |
| CN | 107873020 | A | 4/2018 |
| CN | 107920961 | A | 4/2018 |
| CN | 109180022 | A | 1/2019 |
| EP | 3095433 | A1 | 11/2016 |
| EP | 3095434 | A1 | 11/2016 |
| WO | 2019202333 | A1 | 10/2019 |

OTHER PUBLICATIONS

Fischer et al., "Chemical strengthening of a dental lithium disilicate glass-ceramic material", Journal of Biomedical Materials Research, Part A, vol. 87A, No. 3, Jan. 9, 2008. (6 pages).
Extended European Search Report for European Counterpart Application No. 23175437.5, mailed Feb. 9, 2024. (10 pages).
Chinese Office Action for Chinese Counterpart Application No. 202211105740.2, mailed Jul. 29, 2023 (9 pages).

* cited by examiner

GLASS-CERAMIC DENTAL PROSTHESIS AND METHOD FOR PREPARING THE SAME, METHOD FOR REINFORCING GLASS OR GLASS-CERAMICS, AND ALKALINE REINFORCING PASTE

CROSS-REFERENCE TO RELATED APPLICATIONS

This application claims priority to Chinese patent application No. 202211105771.8, filed on Sep. 9, 2022, named "METHOD FOR REINFORCING GLASS OR GLASS-CERAMICS, AND ALKALINE REINFORCING PASTE", and Chinese patent application No. 202211105740.2, filed on Sep. 9, 2022, named "GLASS-CERAMIC DENTAL PROSTHESIS AND METHOD FOR PREPARING THE SAME", wherein the content of each application is hereby incorporated by reference in its entirety.

TECHNICAL FIELD

The present disclosure relates to the technical field of glass-ceramics, in particular to a glass-ceramic dental prosthesis and a method for preparing the same, a method for reinforcing glass or glass-ceramics, and an alkaline reinforcing paste.

BACKGROUND

With the development of society, people pay more and more attention to dental health and aesthetic issues, the problems such as caries, accidental tooth breakage and loss, tooth loss due to aging, etc. All need suitable dental materials for repair. Therefore, the development and progress of dental materials are becoming more and more important. For a good dental material, it is necessary to balance mechanical properties, biological compatibilities and aesthetic properties.

Conventional dental materials mainly include glass-ceramic materials and zirconia ceramic materials. Glass-ceramic materials have advantages such as similarity to natural teeth in terms of the mechanical strength and semi-transparent looks, and easy mechanical processing and the like, and thus become more and more widely used. However, zirconia ceramic materials, with higher mechanical strength, are often chosen even though aesthetic properties would be sacrificed to some degree in the application to multi-unit bridge inlay and prosthesis requiring higher strength. Therefore, enhancing the strength of dental glass-ceramic materials without sacrificing aesthetic properties has become a very realistic requirement.

The conventional technical approaches for enhancing the strength of glass-ceramic materials mainly include physical reinforcement and chemical reinforcement. The physical reinforcement, also known as thermal strengthening, is realized by rapid cooling to form compressive stress on a surface of glass. Because of its simple manufacturing process and good toughening effect, it is widely used in large-scale glass parts, for example in buildings and automobiles. However, due to the principle of physical reinforcement, it is required to maintain a large temperature difference between the surface and the interior of the glass during the process, which requires the glass to have a certain thickness (usually more than 6 mm), so it is not very practical to-dental glass-ceramics which are thinner and smaller. Chemical reinforcement, also known as ion strengthening is a technology that replaces smaller ions in glass materials (such as lithium ions) with larger ions (such as sodium or potassium ions) by high-temperature ion exchange process, to form a compressive stress on the surface, thereby enhancing the strength of glass. This technology can now be applied to thinner glass, such as display cover glass in electronic devices, and for reinforcing dental glass-ceramic materials in some studies.

At present, in order to improve the aesthetic indicators of glass-ceramic dental prostheses to have a more similar appearance to natural teeth, it is usually necessary to glaze the surface of the glass-ceramic dental prostheses. Generally, glazing temperature is about 700-820° C., while chemical reinforcement is only effective when processed at or below strain point, which of the dental glass-ceramic material is about 450-500° C. If chemical reinforcement is carried out before glazing, the compressive stress on the surface of the glass-ceramics dental prostheses obtained by chemical reinforcing will be relaxed rapidly, therefore erases the reinforcing effect. If chemical reinforcement is carried out after glazing, the surface of glazing supposed to be smooth and clean will become rougher due to the erosion by molten salt, greatly affecting the appearance of the glass-ceramic dental prostheses.

SUMMARY

Accordingly, the present disclosure provides a glass-ceramic dental prosthesis that can balance aesthetic and mechanical strength, a method for reinforcing glass or glass-ceramics, and an alkaline reinforcing paste.

A first aspect of the present disclosure provides a glass-ceramic dental prosthesis having a metal ion-reinforced surface and an other surface region. An area of the metal ion-reinforced surface is smaller than an entire surface area of the glass-ceramic dental prosthesis. A concentration of a reinforcing metal ion on the metal ion-reinforced surface is $C_1$%. A concentration of the reinforcing metal ion on the other surface region of the glass-ceramic dental prosthesis is $C_2$%. $C_1$ is greater than $C_2$.

In one of the embodiments, the reinforcing metal ion diffuses inwards into the glass-ceramic dental prosthesis from the metal ion-reinforced surface, and the concentration of the reinforcing metal ion decreases inwards gradually from the metal ion-reinforced surface.

In one of the embodiments, a difference between $C_1$ and $C_2$ is greater than or equal to 1.

In one of the embodiments, the difference between $C_1$ and $C_2$ is 1 to 5.

In one of the embodiments, a preform of the glass-ceramic dental prosthesis is made of a glass-ceramic containing lithium ion.

In one of the embodiments, the glass-ceramic containing lithium ion is a lithium silicate glass-ceramic.

In one of the embodiments, the reinforcing metal ion is one or more selected from the group consisting of an alkali metal ion and an alkaline earth metal ion.

In one of the embodiments, the reinforcing metal ion is one or more selected from the group consisting of potassium ion, sodium ion, calcium ion, magnesium ion, rubidium ion and cesium ion; further, the reinforcing metal ion is potassium ion.

In one of the embodiments, the other surface region is provided with a glazed layer.

The present disclosure further provides a method for preparing the glass-ceramic dental prosthesis according to the first aspect, including:

(1) performing a glazing treatment on a preform of the glass-ceramic dental prosthesis to form a glazed layer in an other surface region;

(2) chemically reinforcing the preform prepared in step (1) to form a metal ion-reinforced surface.

A second aspect of the present disclosure provides a method for reinforcing glass or glass-ceramics, including:

preparing an alkaline reinforcing paste mainly including a metal ion compound and a stabilizer;

coating the alkaline reinforcing paste on at least part of a surface of the glass or the glass-ceramics, and performing a heat treatment.

In one of the embodiments, the heat treatment is performed at a temperature of 400° C. to 550° C.

In one of the embodiments, the heat treatment is performed for 10 min to 60 min.

In one of the embodiments, the stabilizer is one or more organic solvent having a decomposition temperature below 500° C. Optionally, the stabilizer is one or more selected from the group consisting of butanediol, glycerol, polyethylene glycol, terpilenol, oleic acid and caproic acid.

In one of the embodiments, the metal ion in the metal ion compound is an alkaline or alkaline earth metal cation. Optionally, the metal ion is one or more selected from the group consisting of potassium ion, sodium ion, calcium ion, magnesium ion, rubidium ion and cesium ion. Further optionally, the metal ion is potassium ion. Optionally, the metal ion compound is one or more selected from the group consisting of potassium nitrate, potassium sulfate, potassium chloride, potassium carbonate, potassium bicarbonate, potassium acetate, potassium silicate, potassium hydroxide, sodium hydroxide, sodium carbonate, sodium bicarbonate, sodium acetate, sodium silicate, sodium nitrate, magnesium nitrate and cesium nitrate.

In one of the embodiments, the alkaline reinforcing paste includes the following components in mass percentage:

35% to 80% the metal ion compound,

20% to 65% the stabilizer, and

0% to 10% water.

In one of the embodiments, the alkaline reinforcing paste satisfies the following conditions: a solution obtained by dissolving every 1 g of the alkaline reinforcing paste in 1,000 mL of water has a pH value greater than 8. Further, the pH value of the obtained solution is greater than 9.

In one of the embodiments, the alkaline reinforcing paste further includes a dispersant accounting for 0% to 15% by mass of the alkaline reinforcing paste. Optionally, the dispersant is an inorganic non-metallic dispersant. Further optionally, the dispersant is one or more selected from the group consisting of silica, alumina, silicon carbide and silicon nitride.

A third aspect of the present disclosure provides an alkaline reinforcing paste, mainly including a metal ion compound and a stabilizer.

In one of the embodiments, the stabilizer is one or more organic solvent having a decomposition temperature below 500° C. Optionally, the stabilizer is one or more selected from the group consisting of butanediol, glycerol, polyethylene glycol, terpilenol, oleic acid and caproic acid.

In one of the embodiments, the metal ions in the metal ion compound is an alkali metal cation or an alkali earth metal cation. Optionally, the metal ion is one or more selected from the group consisting of potassium ion, sodium ion, calcium ion, magnesium ion, rubidium ion and cesium ion. Further optionally, the metal ion is potassium ion. Optionally, the metal ion compound is one or more selected from the group consisting of potassium nitrate, potassium sulfate, potassium chloride, potassium carbonate, potassium bicarbonate, potassium acetate, potassium silicate, potassium hydroxide, sodium hydroxide, sodium carbonate, sodium bicarbonate, sodium acetate, sodium silicate, sodium nitrate, magnesium nitrate and cesium nitrate.

In one of the embodiments, the alkaline reinforcing paste includes the following components in mass percentage:

35% to 80% the metal ion compound,

20% to 65% the stabilizer, and

0% to 10% water.

In one of the embodiments, the alkaline reinforcing paste satisfies the following conditions: a solution obtained by dissolving every 1 g of the alkaline reinforcing paste with 1,000 mL of water has a pH value greater than 8. Further, the pH value of the obtained solution is greater than 9.

In one of the embodiments, the alkaline reinforcing paste further includes a dispersant accounting for 0% to 15% by mass of the alkaline reinforcing paste. Optionally, the dispersant is an inorganic non-metallic dispersant. Further optionally, the dispersant is one or more selected from the group consisting of silica, alumina, silicon carbide and silicon nitride.

DETAILED DESCRIPTION OF THE EMBODIMENTS

Figure 1:
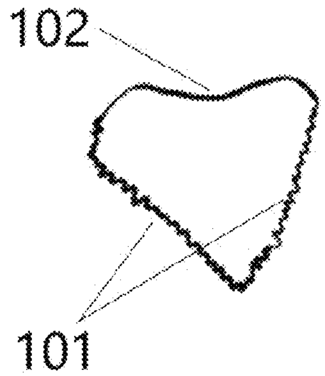
FIG. 1 is a schematic diagram of a glass-ceramic dental prosthesis in an embodiment.

A glass-ceramic dental prosthesis and a method for preparing the same of the present disclosure are described in further detail in combination with specific examples below. The present disclosure can be implemented in many different forms and is not limited to the embodiments described herein. Conversely, the purpose of providing these embodiments is to make the present disclosure more thorough and comprehensive.

Unless otherwise defined, all technical and scientific terms as used herein have the same meaning as commonly understood by one of ordinary skill in the technical field to which the present disclosure belongs. The terms used herein in the specification of the present disclosure are for the purpose of describing specific embodiments only, and are not intended to limit the present disclosure.

The term "one or more" as used herein means any one, two, or more of the items listed.

The terms "first aspect," "second aspect," and the like as used herein are for descriptive purposes only and cannot be understood as indicating or implying relative importance or quantity, nor as implying the importance or quantity of the technical features indicated. Moreover, the terms "first", "second" and the like only serve the purpose of non-exhaustive enumeration and description. It should be understood that they do not constitute a closed limit on quantity.

Herein, the technical features in open language include not only the closed technical scheme consisting of, but also the open technical scheme comprising, the listed features.

Herein, a numerical range is regarded as a continuous range, and includes the minimum and maximum values of the range, as well as each of the values between such minimum and maximum values, unless otherwise specified. Further, the range, when referring to integers, includes each of the integers between the minimum and maximum values of the range. In addition, one or more ranges can be merged when they are provided to describe features or properties. In other words, all of the ranges disclosed herein should be considered to include any and all subranges contained therein unless otherwise specified.

Unless otherwise specified, the percentage content herein refers to the mass percentage for a solid-liquid mixture and a solid-solid mixture, and to the volume percentage for a liquid-liquid mixture. "metal ion concentration" herein refers to the mass concentration.

Unless otherwise specified, the percentage concentration herein refers to a final concentration. The final concentration refers to the proportion of a component in a system to which the component has been added.

Unless otherwise defined, the temperature parameters herein can be treated as constant temperature or within a certain temperature range. The treatment at a constant temperature allows the temperature to fluctuate within the precision range controlled by the instrument.

The term "other surface areas" as used herein refers to all surface regions of the glass-ceramic dental prosthesis other than the metallic ion reinforcing surface.

The term "preform of glass-ceramic dental prosthesis" as used herein refers to a glass-ceramic that has not been subjected to chemical reinforcing or glazing treatment and chemical reinforcing, which has a corresponding shape to the glass-ceramic dental prosthesis.

The inventors have found that the conventional chemical reinforcing method usually involves submerging the prosthesis completely in molten salt, which is believed to guarantee the strength of the prosthesis, however, resulting in a degradation of surface aesthetics, which has always been overlooked.

Accordingly, the present disclosure is the first to try to conduct a reinforcing treatment on only part of a surface of the glass-ceramic dental prosthesis. It is found that, in combination with the reinforcing effect of metal ions, it can still effectively guarantee the strength of the prosthesis, while the other surface region of the glass-ceramic dental prosthesis is not eroded by molten salt, ensuring the appearance of the glass-ceramic dental prosthesis.

In addition, the surface of glass or glass-ceramics eroded by molten salt has such a roughness that, when the surface is used as a bonding surface for glass-ceramic dental prosthesis, no additional hazardous chemicals such as hydrofluoric acid are required for roughening the surface during bonding operation, which simplifies the process and improves the safety for the operator.

An example of the present disclosure provides a glass-ceramic dental prosthesis, the glass-ceramic dental prosthesis has a metal ion-reinforced surface and an other surface region. An area of the metal ion-reinforced surface is smaller than the entire surface area of the glass-ceramic dental prosthesis. A concentration of a reinforcing metal ion on the metal ion-reinforced surface is $C_1$%, and a concentration of the reinforcing metal ion on the other surface region of the glass-ceramic dental prosthesis is $C_2$%. $C_1$ is greater than $C_2$.

In one of the embodiments, the reinforcing metal ion diffuses inwards into the glass-ceramic dental prosthesis from the metal ion-reinforced surface, and the concentration of the reinforcing metal ion decreases inwards gradually from the metal ion-reinforced surface.

In one of the embodiments, a difference between $C_1$ and $C_2$ is greater than or equal to 1.

In one of the embodiments, the difference between $C_1$ and $C_2$ is 1 to 5. Specifically, the difference between $C_1$ and $C_2$ includes, but is not limited to, 1, 1.5, 2, 2.5, 3, 3.5, 4, 4.5, and 5.

It can be understood that a metal ion that is the same as the reinforcing metal ion may or not be present on the other surface region. Such a metal ion is introduced through the preparation process of the preform of the glass-ceramic dental prosthesis since the metal ion reinforcing is not performed on the other surface region, that is, the metal ion is what the glass-ceramic dental prosthesis itself already has before the reinforcing treatment, which is not obtained through the reinforcing treatment. If the metal ion that is the same as the reinforcing metal ions is not present on the other surface region, the $C_2$ is zero.

In one of the embodiments, the preform of the glass-ceramic dental prosthesis is made of a glass-ceramic containing lithium ion. Exchanging the lithium ion with the reinforcing metal ion is more conducive to maintaining the strength of the glass while only one surface being reinforced. Further, the preform of the glass-ceramic dental prosthesis is made of a lithium silicate glass-ceramic. Further, the preform of the glass-ceramic dental prosthesis is made of a material containing lithium disilicate as main crystal phase.

In one of the embodiments, the reinforcing metal ion is one or more selected from the group consisting of an alkali metal ion and an alkaline earth metal ion. It can be understood that the alkali metal ion refers to an alkali metal ion other than lithium ion.

In one of the embodiments, the reinforcing metal ion is one or more selected from the group consisting of potassium ion, sodium ion, calcium ion, magnesium ion, rubidium ion, and cesium ion. Further, the reinforcing metal ion is potassium ion.

In addition, in one of the embodiments, the other surface region is provided with a glazed layer. It makes the appearance of the glass-ceramic dental prosthesis more aesthetic, and more similar to natural teeth, improving acceptance by patients.

The present disclosure further provides a method for preparing the glass-ceramic dental prosthesis as described above, including:

chemically reinforcing a preform of the glass-ceramic dental prosthesis to form a metal ion-reinforced surface.

It can be understood that the "chemically reinforcing" here is performed on the surface on the preform of the glass-ceramic dental prosthesis that corresponds to the metal ion-reinforced surface, so the metal ion-reinforced surface can be formed.

In one of the embodiments, the method for preparing the glass-ceramic dental prosthesis includes the following steps:

(1) performing a glazing treatment on a preform of the glass-ceramic dental prosthesis to form a glazed layer on an other surface region;

(2) chemically reinforcing the preform prepared in step (1) to form a metal ion-reinforced surface.

It can be understood that, in the aforementioned method, the glazing treatment occurs before chemical reinforcing. The glazing treatment can be performed according to the conventional method in the art, including but not limited to glaze coating and sintering.

It can be understood that preparing the preform of the glass-ceramic dental prosthesis can be further included before the glazing treatment. Without limitation, preparing the preform of the glass-ceramic dental prosthesis can be carried out according to the conventional method in the art.

In one of the embodiments, a process for preparing the preform of the glass-ceramic dental prosthesis includes:

subjecting a glass precursor to a first heat treatment to prepare a glass-ceramic intermediate containing $Li_2SiO_3$ as main crystal phase;

subjecting the glass-ceramic intermediate to a molding treatment, and then to a second heat treatment for conversion of the main crystal phase from lithium metasilicate to lithium disilicate ($Li_2Si_2O_5$) to prepare the preform of the glass-ceramic dental prosthesis.

Specifically, methods of the molding treatment include but are not limited to hot die casting, machining (such as CAD/CAM machining), etc. The molding treatment can be performed according to a dental cast or a 3D model of the dental cast.

In one of the embodiments, a process for chemical reinforcing includes:

immersing at least a surface of the preform prepared in step (1) that corresponds to the metal ion-reinforced surface in a molten salt bath for ion reinforcing to form the metal ion-reinforced surface.

Further, the salt bath is a salt including the reinforcing metal ion.

In one of the embodiments, a process for chemical reinforcing includes:

forming a protective film by a plating treatment on a surface of the glazed layer of preform prepared in step (1);

immersing at least a surface that corresponds to the metal ion-reinforced surface in a molten salt bath for ion reinforcing to form the metal ion-reinforced surface; and removing the protective film.

It can be understood that the protective film formed by the plating treatment on the surface of the glazed layer has a protective effect on the glazed layer, such that the surface that corresponds to the metal ion-reinforced surface can be immersed in the molten salt bath to perform ion reinforcing, or the entire preform subjected to the plating treatment can be immersed in the molten salt bath to perform ion reinforcing.

Further, the salt bath is a salt including the reinforcing metal ion.

Without limitation, the protective film is made of an inorganic plating film or a high-temperature resistant coating that is stable at a temperature below 800° C. The inorganic plating film can be made of, for example, silicon dioxide, titanium dioxide, titanium, nickel, or the like, and the high-temperature coating can be, for example, glass powder-doped silicone coating, ceramic-based coating, or the like.

Without limitation, the processes of the plating treatment can be magnetron sputtering, physical vapor deposition, brushing, and the like. Further, a thickness of the protective film may not be limited as long as it enables the protective effect during the process of ion reinforcing. For example, the thickness of the protective film formed by magnetron sputtering, physical vapor deposition and other processes may be 1 nm to 50 nm, and the thickness of the protective film formed by brushing may be 0.05 mm to 1 mm.

In one of the embodiments, a process for chemical reinforcing includes:

coating a metal reinforcing paste on the surface that corresponds to the metal ion-reinforced surface on the preform prepared in step (1), and sintering the coating to form the metal ion-reinforced surface.

Further, the metal reinforcing paste includes a salt of the reinforcing metal ions and a thickener. That is, the salt of the reinforcing metal ion is made into a paste for coating by mixing with the thickener.

The following are specific examples.

The dental glass containing Li (glass precursor) used in the example was produced by Fuzhou Rick Brown Biomaterials Co., Ltd. with model number HT-0M1.

Example 1

This example was a glass-ceramic dental prosthesis as shown in FIG. 1, having a metal ion-reinforced surface 101 and an other surface region 102.

Figure 2:
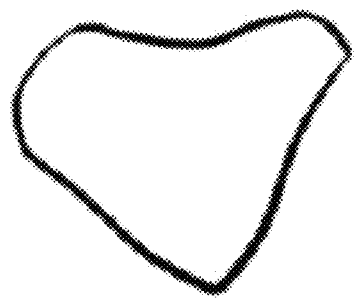
FIG. 2 is a schematic diagram of a glass-ceramic preform in an embodiment.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was cut and molded with digital processing equipment;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

Figure 3:
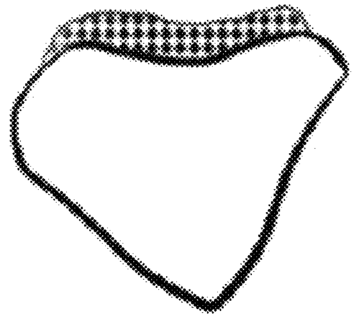
FIG. 3 is a schematic diagram of a surface of the glass-ceramic preform coated with a protective layer in an embodiment.
Figure 4:
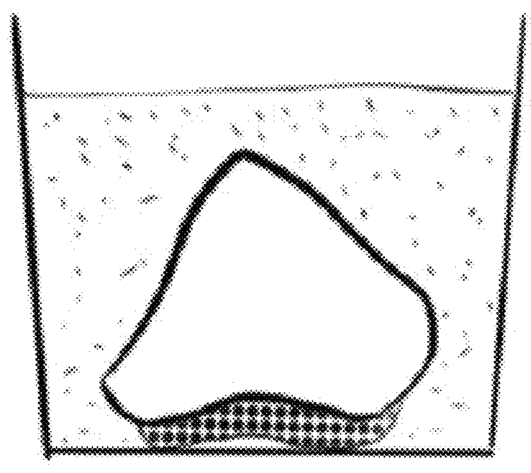
FIG. 4 is a schematic diagram of reinforcing treatment on the preform coated with the protective layer in an embodiment.
Figure 5:
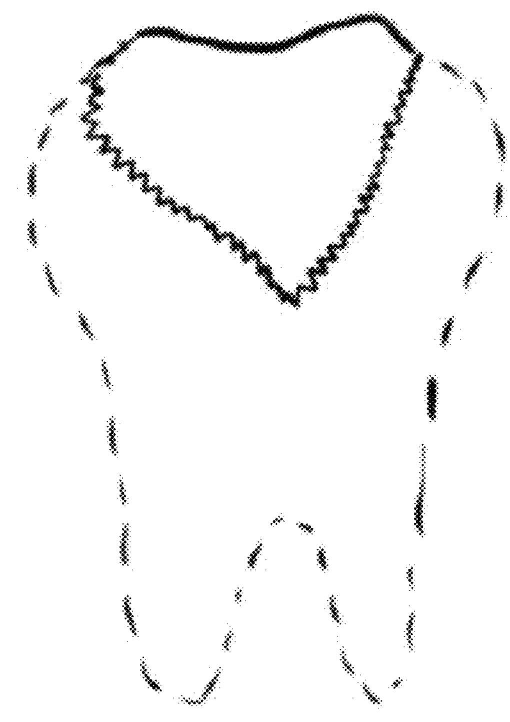
FIG. 5 is a schematic diagram of the prepared glass-ceramic dental prosthesis as an inlay in an embodiment.

(5) the surface of the other surface region 102 was coated with a layer of metallic titanium in a thickness of 20 nm by ion sputtering, as shown in FIG. 3;

(6) the preform coated with the protective layer was buried in a molten reinforcing salt, which was a mixture of potassium nitrate and potassium sulfate at a mass ratio of 4:1, contained in a high-temperature-resistant stainless steel container, and then subjected to the reinforcing treatment in a high-temperature furnace at a reinforcing temperature of 500° C. for 30 min, as shown in FIG. 4;

(7) after the reinforcing was completed, the preform was cooled in air, and then soaked in dilute hydrochloric acid to remove the layer of metallic titanium on the surface of the other surface region 102;

(8) the obtained prosthesis was ultrasonic cleaned in clean water and dried, and was ready for use as an inlay, as shown in FIG. 5.

Example 2

This example was a glass-ceramic dental prosthesis, as shown in FIG. 1, having a metal ion-reinforced surface 101 and an other surface region 102.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

(5) the surface of the other surface region 102 was coated with a layer of metallic nickel in a thickness of 5 nm by physical vapor deposition, as shown in FIG. 3.

(6) the preform coated with the protective layer was buried in a molten reinforcing salt, which was a mixture of potassium nitrate and sodium nitrate at a mass ratio of 4:1, contained in a high-temperature-resistant stainless steel container, and then subjected to the reinforcing treatment in a high-temperature furnace at a reinforcing temperature of 400° C. for 60 min, as shown in FIG. 4;

(7) after the reinforcing was completed, the preform was cooled in air, and then soaked in dilute hydrochloric acid to remove the layer of metallic titanium on the surface of the other surface region 102;

(8) the obtained prosthesis was ultrasonic cleaned in clean water and dried, and was ready for use as an inlay, as shown in FIG. 5.

Example 3

This example was a glass-ceramic dental prosthesis, as shown in FIG. 1, having a metal ion-reinforced surface 101 and an other surface region 102.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

Figure 6:
FIG. 6 is a graph showing the change of potassium ion concentration in the prepared glass-ceramic dental prosthesis in an embodiment.
Figure 6:
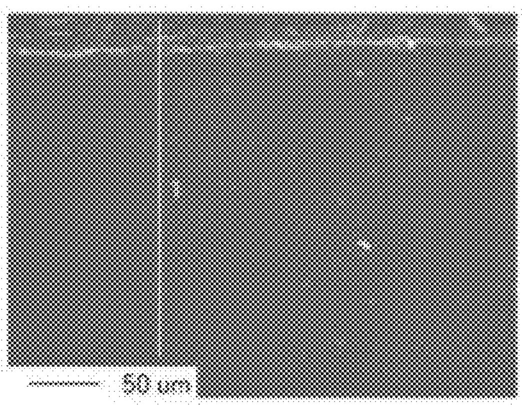
Figure 6:
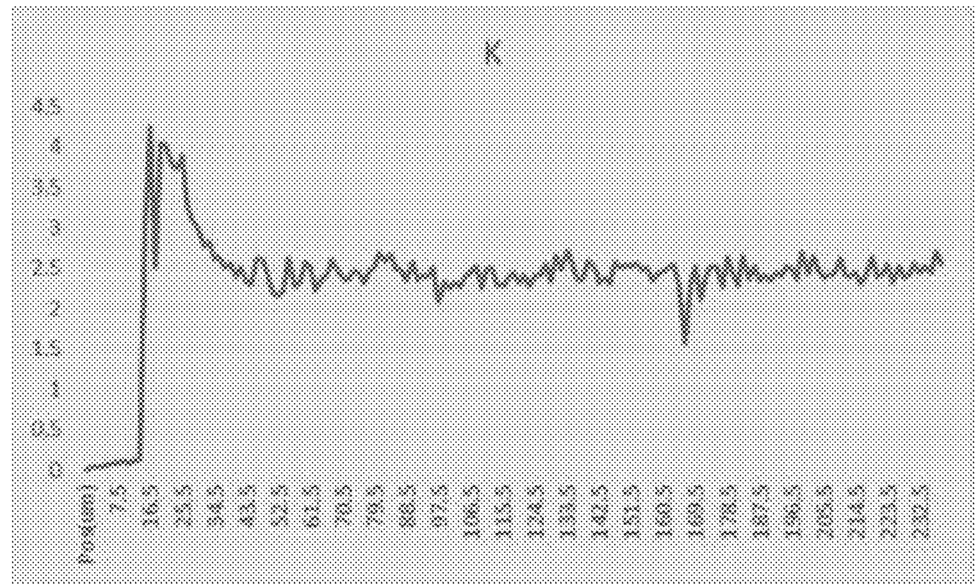

(5) the surface of the other surface region 102 was coated with a glass powder-doped silicone coating in a thickness of 0.1 mm by brushing, as shown in FIG. 3;

(6) the preform coated with the protective layer was buried in a molten reinforcing salt, which was potassium nitrate as a single component, contained in a high-temperature-resistant stainless steel container, and then subjected to the reinforcing treatment in a high-temperature furnace at a reinforcing temperature of 370° C. for 90 min, as shown in FIG. 4;

(7) after the reinforcing was completed, the preform was cooled in air, and then soaked in an organic solvent to remove the high-temperature resistant coating on the surface of the other surface region 102;

(8) the obtained prosthesis was ultrasonic cleaned in clean water and dried, and was ready for use as an inlay, as shown in FIG. 5. The change in the concentration of the potassium ions from the metal ion-reinforced surface 101 to the interior was shown in FIG. 6 (the curve graph obtained by electron probe microanalysis (EPMA) in combination with linear scanning analysis of the element concentration), the potassium ion concentration on the metal ion-reinforced surface 901 was about 4.5%, and then gradually decreased to about 2.5%, and finally tended to be constant.

Example 4

This example was a glass-ceramic dental prosthesis as shown in FIG. 1, having a metal ion-reinforced surface 101 and an other surface region 102.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was cut and molded with digital processing equipment;

(3) molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

Figure 7:
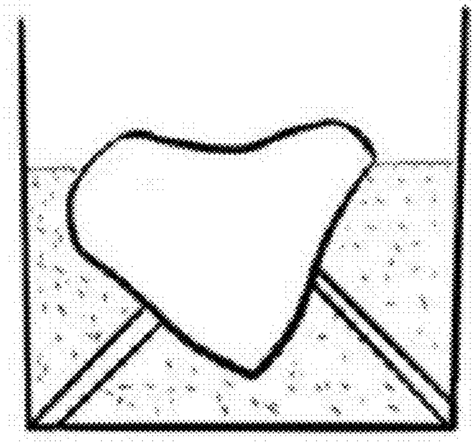
FIG. 7 is a schematic diagram of a principle and a device of using a bracket fixing the glass-ceramic preform for reinforcing treatment in an embodiment.

(5) the preform was fixed with a support frame such that the surface that corresponds to the metal ion-reinforced surface 101 is immersed in, and the other surface region 102 is not in contact with, the molten reinforcing salt, which was potassium nitrate as a single component, contained in a high-temperature-resistant stainless steel container. The principle and the device were as shown in FIG. 7). Then the preform was subjected to the reinforcing treatment in a high-temperature furnace at a reinforcing temperature of 400° C. for 120 min;

(6) after reinforcing is completed, the preform was cooled in air, ultrasonic cleaned in clean water and dried, and was ready for use as an inlay, as shown in FIG. 5.

Example 5

This example was a glass-ceramic dental prosthesis, as shown in FIG. 1, having a metal ion-reinforced surface 101 and an other surface region 102.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

Figure 8:
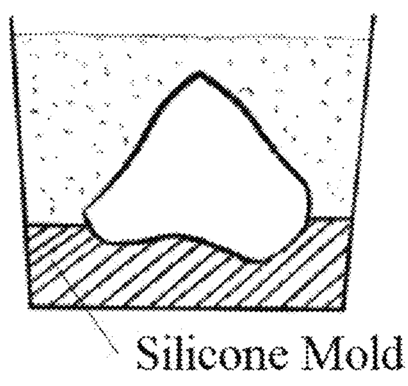
FIG. 8 is a schematic diagram of a principle of and a device for reinforcing treatment using high-temperature resistant silica gel to protect the glaze in an embodiment.

(5) The preform was embedded in high-temperature-resistant silica gel filled in a metal box such that the other glazed surface region 102 were closely bonded to the high-temperature-resistant silica gel. The space was filled with the molten reinforcing salt, which is sodium nitrate as a single component, such that the surface that corresponds to the metal ion-reinforced surface 101 was immersed in the molten reinforcing salt. The box was sealed with the box cover. The principle and the device were shown in FIG. 8. Then the preform was subjected to the reinforcing treatment in a high-temperature furnace at a reinforcing temperature of 350° C. for 240 min;

(6) after reinforcing was completed, the preform was cooled in air, ultrasonic cleaned in clean water and dried, and was ready for use as an inlay, as shown in FIG. 5.

Example 6

This example was a glass-ceramic dental prosthesis, as shown in FIG. 1, having a metal ion-reinforced surface 101 and an other surface region 102.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

Figure 9:
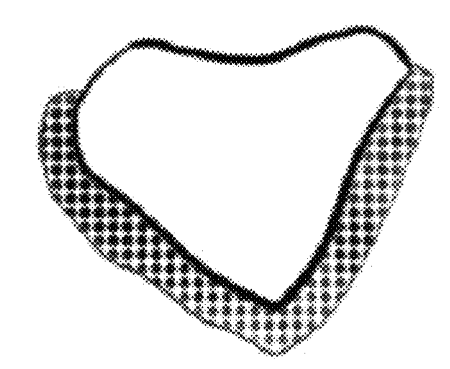
FIG. 9 is a schematic diagram of reinforcing treatment by coating with paste salt in an embodiment.

(5) a paste of salt was prepared, which includes, by mass, 10% potassium carbonate, 10% alumina, 35% potassium nitrate, 40% butanediol and 5% water;

(6) the surface that corresponds to the metal ion-reinforced surface 101 (as shown in FIG. 9) was coated evenly with the paste of salt using a soft brush, then subjected to the sintering treatment at a sintering temperature was 500° C. for 30 min;

(7) after the sintering treatment was completed, the preform was cooled in air, ultrasonic cleaned in clean water and dried, and was ready for use as an inlay, as shown in FIG. 5.

Example 7

Figure 10:
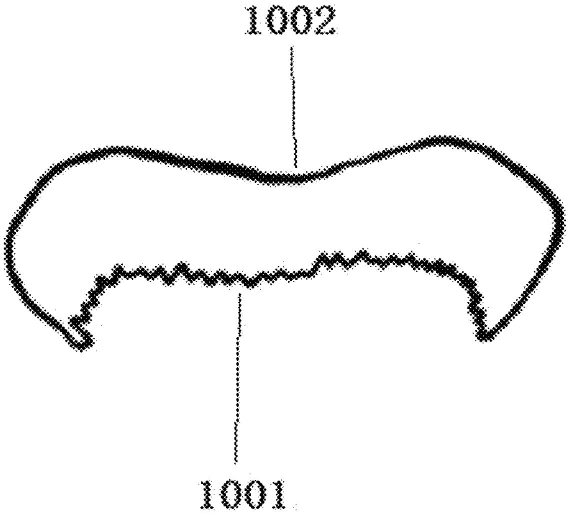
FIG. 10 is a schematic diagram of a glass-ceramic dental prosthesis in another embodiment.

This example was a glass-ceramic dental prosthesis, as shown in FIG. 10, with a metal ion-reinforced surface 1001 and an other surface region 1002.

Figure 11:
FIG. 11 is a schematic diagram of a glass-ceramic preform in another embodiment.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 11;

(4) the other surface regions 1002 of the glass-ceramic preform was subjected to glazing and sintering treatment.

Figure 12:
FIG. 12 is a schematic diagram of reinforcing treatment by coating paste salt in another embodiment.
Figure 13:
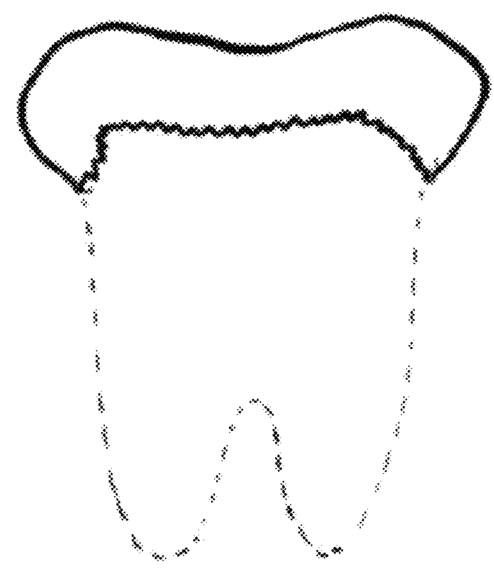
FIG. 13 is a schematic diagram of the prepared glass-ceramic dental prosthesis as a dental crown in another embodiment.

(5) a paste of salt was prepared, which includes, by mass, 5% potassium carbonate, 5% alumina, 60% potassium nitrate, 25% butanediol and 5% water;

(6) the surface that corresponds to the metal ion-reinforced surface 101 (as shown in FIG. 12) was coated evenly with the paste of salt using a soft brush, then subjected to the sintering treatment at a sintering temperature was 400° C. for 60 min;

(7) after the sintering treatment was completed, the preform was cooled in air, ultrasonic cleaned in clean water and dried, and was ready for use as a dental crown, as shown in FIG. 13.

Comparative Example 1

This comparative example was a glass-ceramic dental prosthesis which differed from Example 3 in the absence of metal ion-reinforced surface 101, as shown in FIG. 2.

The glass-ceramic dental prosthesis was prepared as follows:

(1) the dental glass containing Li was subjected to the first heat treatment, obtaining a glass-ceramic intermediate containing $Li_2SiO_3$ as main crystal phase;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region 102 of the glass-ceramic preform was subjected to glazing.

(5) after the sintering treatment was completed, the preform was cooled in air, ultrasonic cleaned in clean water and dried, and was ready for use as an inlay.

Comparative Example 2

Figure 14:
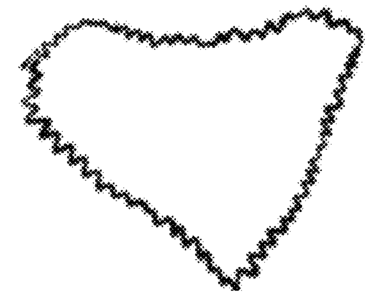
FIG. 14 is a schematic diagram of a glass-ceramic dental prosthesis in a comparative embodiment.

This comparative example was a glass-ceramic dental prosthesis, which differed from Example 6 in that all of the surfaces of the prosthesis were metal ion-reinforced surfaces, as shown in FIG. 14.

Figure 15:
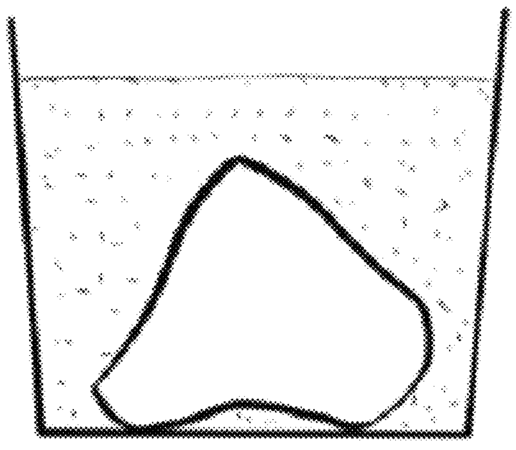
FIG. 15 is a schematic diagram of a reinforcing treatment of the preform in a comparative embodiment.
Figure 16:
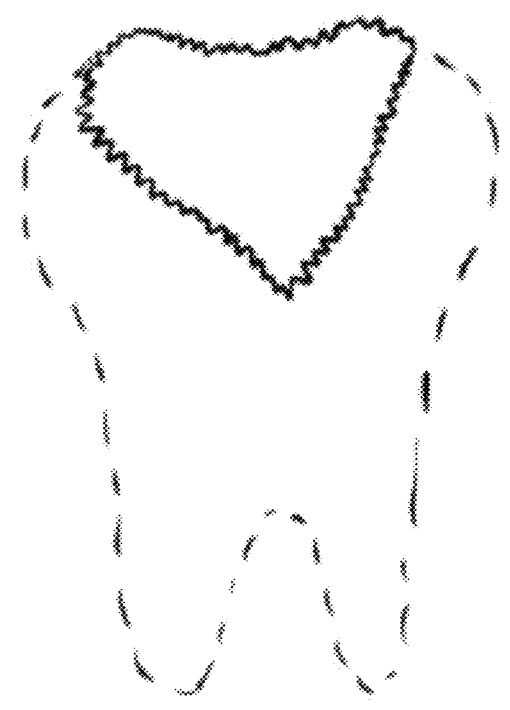
FIG. 16 is a schematic diagram of the prepared glass-ceramic dental prosthesis as an inlay in a comparative embodiment.

The glass-ceramic dental prosthesis was prepared as follows:

(1) the dental glass containing Li was subjected to the first heat treatment, obtaining a glass-ceramic intermediate;

(2) the glass-ceramic intermediate was molded by hot pressure casting according to the conventional dental cast;

(3) the molded glass-ceramic intermediate was subjected to the second heat treatment, obtaining a glass-ceramic preform containing $Li_2Si_2O_5$ as main crystal phase, as shown in FIG. 2;

(4) the other surface region of the glass-ceramic preform was subjected to glazing;

(5) the preform was buried in the molten reinforcing salt, which was a mixture of 10% potassium carbonate, 10% alumina, 35% potassium nitrate, 40% butanediol and 5% water, contained in in a high-temperature-resistant ceramic container, and then subjected to the reinforcing treatment in a high-temperature furnace at a reinforcing temperature of 400° C. for 60 min, as shown in FIG. 15;

(7) after reinforcing is completed, the preform was cooled in air, ultrasonic cleaned in and dried, and was ready for use as an inlay, as shown in FIG. 16.

Strength Test and Appearance Comparison:

The method of strength test is as follows: sample strips were prepared according to the three-point bending strength test in GB/T 30367-2013, subjected to the treatment according to Example 1 to 7 and Comparative Example 1 to 2, respectively, and then tested for strength.

The results are shown in Table 1 below:

TABLE 1

| No. | Strength (MPa) | Surface appearance |
|---|---|---|
| Example 1 | 507 ± 25 | smooth |
| Example 2 | 595 ± 32 | smooth |
| Example 3 | 619 ± 44 | smooth |
| Example 4 | 507 ± 28 | smooth |
| Example 5 | 584 ± 25 | smooth |
| Example 6 | 572 ± 26 | smooth |
| Example 7 | 525 ± 25 | smooth |
| Comparative Example 1 | 448 ± 20 | smooth |
| Comparative Example 2 | 601 ± 23 | rough |

Glass, which is an amorphous inorganic non-metallic material, generally made of a variety of inorganic minerals (such as quartz sand, borax, boric acid, barite, barium carbonate, limestone, feldspar, soda ash, etc.) as the main raw materials in combination with a small amount of auxiliary raw materials, is an amorphous solid with an irregular structure. A glass-ceramic refers to a multiphase complex with dense microcrystalline phase and glass phase, which is formed by using a base glass of a specific composition with a crystal nucleating agent (or without a crystal nucleating agent) and undergoing crystallization heat treatment under a certain temperature system to uniformly precipitate a large number of tiny crystals in the glass. Glass and glass-ceramics are widely used in areas such as electronics, vehicles, dentistry, architecture, etc.

However, glass or glass-ceramics itself has a problem of low strength and often requires reinforcement in practical applications. The conventional technical approaches for enhancing the strength of glass-ceramic materials mainly include physical reinforcement and chemical reinforcement. The physical reinforcement, also known as thermal strengthening, is realized by rapid cooling to form compressive stress on a surface of glass. Because of its simple manufacturing process and good toughening effect, it is widely used in large-scale glass parts, for example in buildings and automobiles. However, due to the principle of physical reinforcement, it is required to maintain a large temperature difference between the surface and the interior of the glass during the process, which requires the glass to have a certain thickness (usually more than 6 mm), so it is not very practical to dental glass-ceramics which are thinner and smaller. Chemical reinforcement, also known as ion strengthening is a technology that replaces smaller ions in glass materials (such as lithium ions) with larger ions (such as sodium or potassium ions) by high-temperature ion exchange process, to form a compressive stress on the surface, thereby enhancing the strength of glass. This technology can now be applied to thinner glass, such as display cover glass in electronic devices, and for reinforcing dental glass-ceramic materials in some studies. Nevertheless, conventional chemical reinforcing methods have obvious disadvantages in application, for example:

(1) the operation of high temperature liquid molten salt poses a safety risk to engineering personnel because high temperature resistant containers to hold molten salt is required.

(2) molten salt in large quantities is required since glass or glass-ceramics should be fully immersed in the molten salt, resulting in a waste in production and, when discarding the molten salt, damage to the environment.

(3) it is difficult to partially reinforcing glass or glass-ceramics because the glass or glass-ceramics should be fully immersed in molten salt.

The molten salt used in the conventional chemical reinforcing method is in the form of solid particles or masses at room temperature. The salt can be obtained in liquid form only after molten, and thus cannot be used for coating at room temperature. Therefore, the conventional chemical reinforcing method based on this is no more than completely immersing the glass or glass-ceramics in the solution or molten salt for ion exchange treatment, so as to improve the strength of the glass or glass-ceramics. In the conventional technology, there are many problems that has not been fundamentally resolved, such as inconvenient operation, high cost and poor reinforcing effect, impact on the appearance of other regions, hence sacrificing the aesthetics, and so on.

Accordingly, the inventor, upon a large number of experimental studies, provides a novel method for reinforcing glass or glass-ceramics, and have tried for the first time to apply a reinforcing metal salt by coating with an alkaline reinforcing paste in combination with heat treatment, in order to reinforce the glass or glass-ceramics in a predetermined region at will. It can be done with simple operation, reduced cost, improved reinforcing effect, and without affecting the properties of other regions. Such prepared glass or glass-ceramics can also balance the aesthetic and good mechanical strength, and meet the requirement for local reinforcement of glass or glass-ceramics products. It can be seen that the method for reinforcing glass or glass-ceramic has the following remarkable advantages:

(1) no high temperature resistant container for containing molten salt is needed in contrast to conventional reinforcing method, resulting in reduced waste of molten salt and protecting the environment.

(2) no treatment using high-temperature molten salt in liquid form is needed upon application, leading to convenient and simple operation and reduced danger and professional requirements to operators.

(3) this method for reinforcing glass or glass-ceramics satisfies the requirement for targeted local reinforcement, especially for glass products that are locally subjected to high stress, such as dental glass or glass-ceramics, providing targeted reinforcement for the adhesive surface without compromising the appearance surface.

The present disclosure provides a method for reinforcing glass or glass-ceramics, including:

preparing an alkaline reinforcing paste mainly including a metal ion compound and a stabilizer;

coating the alkaline reinforcing paste on at least part of a surface of the glass or the glass-ceramics, and performing a heat treatment.

It can be understood that the region to be reinforced and coated with the alkaline reinforcing paste can be selected as needed. Either the entire surface of glass or glass-ceramics or part of the surface of glass or glass-ceramics can be selected.

In one of the embodiments, the heat treatment is performed at a temperature of 400° C. to 550° C., specifically including, but not limited to, 400° C., 410° C., 420° C., 430° C., 440° C., 450° C., 460° C., 470° C., 480° C., 490° C., 500° C., 510° C., 520° C., 530° C., 540° C., and 550° C.

In one of the embodiments, the heat treatment is performed for 10 min to 60 min, specifically including, but not limited to, 10 min, 20 min, 25 min, 28 min, 30 min, 32 min, 35 min, 40 min, 43 min, 45 min, 47 min, 50 min, 55 min, 58 min, 60 min.

In one of the embodiments, the heat treatment is performed at a temperature of 400° C. to 550° C. for 10 min to 60 min.

In one of the embodiments, the metal ionic compound and the stabilizer is at a mass ratio of (35 to 80):(65 to 20), specifically including, but are not limited to, 35:65, 45:55, 55:45, 60:40, 70:30, and 80:20.

In addition, in one of the embodiments, the metal ion in the metal ion compound is an alkali metal cation or an alkali earth metal cation. Optionally, the metal ion is one or more selected from the group consisting of potassium ion, sodium ion, calcium ion, magnesium ion, rubidium ion and cesium ion. Further optionally, the metal ion is potassium ion. A better reinforcing effect can be obtained by ion exchange using potassium ions.

In one of the embodiments, the metal ionic compound is one or more selected from the group consisting of potassium nitrate, potassium sulfate, potassium chloride, potassium carbonate, potassium bicarbonate, potassium acetate, potassium silicate, potassium hydroxide, sodium hydroxide, sodium carbonate, sodium bicarbonate, sodium acetate, sodium silicate, sodium nitrate, magnesium nitrate and cesium nitrate.

In one of the embodiments, the stabilizer is a mixture of one or more organic solvents having a decomposition temperature below 500° C. Without limitation, the stabilizer is one or more selected from the group consisting of butanediol, glycerol, polyethylene glycol, terpilenol, oleic acid and caproic acid. By selecting a suitable stabilizer, the paste can be ensured to be stable and easy for use, thereby ensuring the accurate application on the reinforcing region.

In one of the embodiments, the alkaline reinforcing paste includes the following components in mass percentage.

35% to 80% the metal ion compound,

20% to 65% the stabilizer, and

0% to 10% water.

Specifically, the mass percentage of metal ion compound includes, but is not limited to: 35%, 40%, 45%, 48%, 50%, 52%, 55%, 58%, 60%, 62%, 65%, 68%, 70%, 72%, 75%, or 80%.

The mass percentage of the stabilizer includes, but is not limited to: 20%, 23%, 25%, 27%, 30%, 33%, 35%, 37%, 40%, 45%, 48%, 50%, 52%, 55%, 60%, or 65%.

The mass percentage of water includes, but is not limited to: 0%, 3%, 5%, 6%, 7%, 8%, 9%, or 10%.

It can be understood that the alkaline reinforcing paste is alkaline, that is, the pH value of its aqueous solution is greater than 7. Without limitation, the alkaline reinforcing paste can be made alkaline by an basic metal ion compound or by other basic compounds. In one of the embodiments, the alkaline reinforcing paste is made alkaline by an alkaline metallic ion compound so that no additional compound may be introduced. Specifically, when it is made alkaline by the alkaline metal ion compound, a strong alkaline metal ion compound and/or a weak alkaline metal ion compound, such as one or more of potassium hydroxide, sodium hydroxide, potassium carbonate, potassium bicarbonate, potassium acetate, potassium silicate, sodium carbonate, sodium bicarbonate, sodium acetate and sodium silicate, can be used. In one of the embodiments, the strong alkaline metal ion compound and/or weak alkaline metal ion compound with potassium ion as cation is used. In addition, for the metal ion compounds of the alkaline reinforcing paste, the strong alkaline metal ion compound and/or weak basic metal ion compound can also be used in combination with non-alkaline metal ion compounds, such as one or more selected from the group of potassium nitrate, potassium sulfate and potassium chloride, as long as the purpose of making the alkaline reinforcing paste alkaline can be achieved.

In one of the embodiments, the alkaline reinforcing paste satisfies the following conditions: a solution obtained by dissolving every 1 g of the alkaline reinforcing paste in 1,000 mL of water has a pH value greater than 8. Further, the pH value of the obtained solution is greater than 9. Specifically, the pH value of the obtained solution includes, but is not limited to: 8.1, 8.5, 9, 9.5, 10, 10.5, 11, 11.5, 12, 12.5, 13, 13.5, 14.

Due to the requirement of alkalinity, the permeation of the reinforcing metal ions can be enhanced while realizing the shape of the paste, promoting the exchange of ions, which shortens the time duration of the reinforcing while ensures the effect of reinforcing. Also due to the alkalinity, the surface of glass or glass-ceramics eroded by molten salt has such a roughness that, when the surface is used as a bonding surface for glass-ceramic dental prosthesis, no additional hazardous chemicals such as hydrofluoric acid are required for surface roughening during the bonding operation, which simplifies the process and improves the safety for the operator.

In addition, the alkaline reinforcing paste further includes a dispersant. In one of the embodiments, the dispersant is selected from inorganic non-metallic powder having a melting point above 600° C. Specifically, the dispersant is one or more selected from the group consisting of silica, alumina, silicon carbide, and silicon nitride.

Specifically, a mass fraction of the dispersant is 0% to 15% by mass of the alkaline reinforcing paste. Further, the mass fraction of the dispersant is 0.01% to 15% by mass of the alkaline reinforcing paste. Specifically, the mass percentage of the dispersant includes, but is not limited to: 0%, 0.01%, 0.1%, 1%, 3%, 4%, 5%, 6%, 7%, 8%, 9%, 10%, 11%, 12%, 13%, 14%, 15%.

The present disclosure also provides an alkaline reinforcing paste, mainly including metal ion compounds and stabilizers.

The alkaline reinforcing paste here is the same as that described in the aforementioned reinforcing method, and will not be described repeatedly here.

The present disclosure also provides a method for preparing the reinforcing paste, including the following steps:

mixing components together and ball-milling the mixture.

Understandably, the mixture is ball-milled until forming a paste.

The following are specific examples.

In the following example, glass-ceramic preforms containing Lithium disilicate as main crystal phase was used.

Understandably, the reinforcing method also is applicable to glass or glass-ceramics containing other components of an alkali metal or an alkaline earth metal, such as sodium-aluminum-silica glass, lithium-aluminum-silica glass, glass-ceramics containing feldspar as main crystal phase, glass-ceramics containing spodumene as main crystal phase, and the like.

Example 8

This example shows a method for reinforcing glass-ceramics containing lithium disilicate as main crystal phase, including the following steps.

(1) A reinforcing paste is prepared with the formulation as follows (mass percentage):

| | |
|---|---|
| Potassium Carbonate | 5% |
| Potassium nitrate | 60% |
| Butanediol | 25% |
| Water | 5% |
| Alumina | 5%. |

The above reinforcing paste is prepared by mixing the components together and ball-milling the mixture.

(2) A part of a surface of a glass-ceramic preform is coated evenly with the reinforcing paste using a soft brush, and then is subjected to the heat treatment at a temperature of 500° C. for 30 min.

(3) After the heat treatment was completed, the glass-ceramic preform was cooled in air, ultrasonic cleaned in clean water and dried.

The alkalinity of the reinforcing paste used in this example and the strength of the glass-ceramic were shown in Table 2.

Example 9

This example shows a method for reinforcing glass-ceramics containing lithium disilicate as main crystal phase. The procedure was the same as that in Example 8 except for the formulation of the reinforcing paste. The formulation of the reinforcing paste in this example was as follows (mass percentage):

| | |
|---|---|
| Potassium Carbonate | 20% |
| Potassium nitrate | 40% |
| Butanediol | 30% |
| Water | 5% |
| Alumina | 5%; |

The alkalinity of the reinforcing paste used in this example and the strength of the glass-ceramic were shown in Table 2.

Example 10

This example shows a method for reinforcing glass-ceramics containing lithium disilicate as main crystal phase. The procedure was the same as that in Example 8 except for the formulation of the reinforcing paste. The formulation of the reinforcing paste in this example was as follows (mass percentage):

| | |
|---|---|
| Sodium carbonate | 5% |
| Sodium hydroxide | 5% |
| Potassium sulfate | 55% |
| Glycerin | 25% |
| Water | 10%. |

The alkalinity of the reinforcing paste used in this example and the strength of the glass-ceramic were shown in Table 2.

Example 11

This example shows a method for reinforcing glass-ceramics containing lithium disilicate as main crystal phase. The procedure was the same as that in Example 8 except for the formulation of the reinforcing paste. The formulation of the reinforcing paste in this example is as follows (mass percentage):

| | |
|---|---|
| Sodium hydroxide | 10% |
| Potassium nitrate | 40% |
| Cesium nitrate | 5% |
| Butanediol | 20% |
| Pizoethanol | 15% |
| Alumina | 10%; |

The alkalinity of the reinforcing paste used in this example and the strength of the glass-ceramic were shown in Table 2.

Example 12

This example shows a method for reinforcing glass-ceramics containing lithium disilicate as main crystal phase. The procedure was the same as that in Example 8 except for the formulation of the reinforcing paste. The formulation of the reinforcing paste in this example was as follows (mass percentage):

| | |
|---|---|
| Potassium Carbonate | 40% |
| Potassium sulfate | 6% |
| Magnesium nitrate | 2% |
| Sodium nitrate | 2% |
| Turpentine | 50%. |

The alkalinity of the reinforcing paste used in this example and the strength of the glass-ceramic were shown in Table 2.

Example 13

This example shows a method for reinforcing glass-ceramics containing lithium disilicate as main crystal phase. The procedure was the same as that in Example 8 except for the formulation of the reinforcing paste. The formulation of the reinforcing paste in this example was as follows (mass percentage):

| | |
|---|---|
| Potassium hydroxide | 10% |
| Potassium nitrate | 30% |
| Potassium sulfate | 30% |
| Oleic acid | 30%. |

The alkalinity of the reinforcing paste used in this example and the strength of the glass-ceramic were shown in Table 2.

Example 14

This example shows a method for reinforcing glass-ceramics containing lithium disilicate as main crystal phase. The procedure was the same as that in Example 8 except for the process parameters of the heat treatment in step (2). In this example, the heat treatment was performed at a temperature of 400° C. for 60 min.

The alkalinity of the reinforcing paste used in this example and the strength of the glass-ceramic were shown in Table 2.

Example 15

This example shows a method for reinforcing glass-ceramics containing lithium disilicate as main crystal phase. The procedure was the same as that in Example 8 except for the process parameters of the heat treatment in step (2). In this example, the heat treatment was performed at a temperature of 450° C. for 45 min.

The alkalinity of the reinforcing paste used in this example and the strength of the glass-ceramic were shown in Table 2.

Example 16

This example shows a method for reinforcing glass-ceramics containing lithium disilicate as main crystal phase. The procedure was the same as that in Example 8 except for the process parameters of the heat treatment in step (2). In this example, the heat treatment was performed at a temperature of 550° C. for 10 min.

The alkalinity of the reinforcing paste used in this example and the strength of the glass-ceramic were shown in Table 2.

Comparative Example 3

In this comparative example, a glass-ceramic containing lithium disilicate as main crystal phase according to Example 8 that was not reinforced using a reinforcing paste was used. The strength was shown in Table 2.

Comparative Example 4

This comparative example shows a method for reinforcing glass-ceramics containing lithium disilicate as main crystal phase. The procedure was the same as that in Example 8 except for the formulation of the reinforcing paste. The formulation of the reinforcing paste in this example was as follows (mass percentage):

| | |
|---|---|
| Potassium Carbonate | 1% |
| Potassium nitrate | 53% |
| Butanediol | 33% |
| Water | 7% |
| Alumina | 6%; |

The alkalinity of the reinforcing paste used in this example and the strength of the glass-ceramic were shown in Table 2. The reinforcing paste of this formulation had insufficient alkalinity, resulting in a poor reinforcing effect.

Comparative Example 5

This comparative example shows a method for reinforcing glass-ceramics containing lithium disilicate as main crystal phase. The procedure was the same as that in Example 8 except for the formulation of the reinforcing paste with 10% stabilizer added. The formulation of the reinforcing paste in this example was as follows (mass percentage):

| | |
|---|---|
| Potassium Carbonate | 25% |
| Potassium nitrate | 55% |
| Butanediol | 10% |
| Water | 5% |
| Alumina | 5%. |

The solid content of the reinforcing paste of this formulation was too high to form a paste for the coating step, so the reinforcing treatment and strength effect test was not performed.

Comparative Example 6

This comparative example shows a method for reinforcing glass-ceramics containing lithium disilicate as main crystal phase. The method was the same as that in Example 8 except for the formulation of the paste salt with 70% stabilizer added. The formulation of the reinforcing paste in this example was as follows (mass percentage):

| | |
|---|---|
| Potassium Carbonate | 10% |
| Potassium nitrate | 10% |
| Butanediol | 70% |
| Water | 5% |
| Alumina | 5%; |

The alkalinity of the reinforcing paste used in this example and the strength of the glass-ceramic were shown in Table 2. The solid content of the reinforcing paste of this formula was too low to cover all reinforcing surfaces after the volatilization of the solvent.

Strength Test Methods:

The method of strength test is as follows: sample strips were prepared according to the three-point bending strength test in GB/T 30367-2013, and then tested for strength using a universal testing machine.

The method of alkalinity test is as follows: every 1 g of the reinforcing paste was dissolved in 1,000 mL of water to obtain a solution, which was then tested using a pH tester.

The test results are shown in Table 2 below:

TABLE 2

| No. | Strength (MPa) | Alkalinity |
|---|---|---|
| Example 8 | 595 ± 25 | 9.50 |
| Example 9 | 619 ± 32 | 10.02 |
| Example 10 | 507 ± 44 | 10.42 |
| Example 11 | 584 ± 28 | 10.57 |
| Example 12 | 507 ± 25 | 10.85 |
| Example 13 | 557 ± 26 | 10.21 |
| Example 14 | 529 ± 25 | 9.50 |
| Example 15 | 549 ± 38 | 9.50 |
| Example 16 | 477 ± 23 | 9.50 |
| Comparative Example 3 | 349 ± 27 | / |
| Comparative Example 4 | 408 ± 20 | 6.99 |
| Comparative Example 5 | / | / |
| Comparative Example 6 | 402 ± 85 | 8.57 |

The technical features of the aforementioned embodiments may be combined arbitrarily. To simplify the description, not all the possible combinations of the technical features in the aforementioned embodiments are described. However, all of the combinations of these technical features should be considered as within the scope of the present disclosure, as long as such combinations do not contradict with each other.

The aforementioned examples only express several embodiments of the present disclosure, which facilitates understanding of the technical solution of the present disclosure in detail, but cannot be understood as a restriction on the scope of patent protection. It should be noted that, for a person of ordinary skill in the art, several variations and improvements may be made without departing from the concept of the present disclosure, and these are all within the protection scope of the present disclosure. It should be understood that on the basis of the technical solutions provided in the present disclosure, the technical solutions obtained through logical analysis, reasoning or limited testing are within the scope of protection of the appended claims of the present disclosure. Therefore, the protection scope of this patent application shall be subject to the content of the appended claims, which can be interpreted by the description and the accompanying drawings.

What is claimed is:

1. A glass-ceramic dental prosthesis having a metal ion-reinforced surface and an other surface region, wherein an area of the metal ion-reinforced surface is smaller than an entire surface area of the glass-ceramic dental prosthesis, a concentration of a reinforcing metal ion on the metal ion-reinforced surface is $C_1$%, and a concentration of the reinforcing metal ion on the other surface region of the glass-ceramic dental prosthesis is $C_2$%, and $C_1$ is greater than $C_2$, and a difference between $C_1$ and $C_2$ is greater than 1 and less than 3.

2. The glass-ceramic dental prosthesis according to claim 1, wherein the reinforcing metal ion diffuses inwards into the glass-ceramic dental prosthesis from the metal ion-reinforced surface, and the concentration of the reinforcing metal ion decreases inwards gradually from the metal ion-reinforced surface.

3. The glass-ceramic dental prosthesis according to claim 1, wherein a preform of the glass-ceramic dental prosthesis is made of a glass-ceramic containing lithium ions.

4. The glass-ceramic dental prosthesis according to claim 3, wherein the glass-ceramic containing lithium ions is a lithium silicate glass-ceramic.

5. The glass-ceramic dental prosthesis according to claim 1, wherein the reinforcing metal ions are one or more selected from the group consisting of an alkali metal ion and an alkaline earth metal ion.

6. The glass-ceramic dental prosthesis according to claim 5, wherein the reinforcing metal ions are one or more selected from the group consisting of potassium ion, sodium ion, calcium ion, magnesium ion, rubidium ion and cesium ion.

7. The glass-ceramic dental prosthesis according to claim 6, wherein the reinforcing metal ion is a potassium ion.

8. The glass-ceramic dental prosthesis according to claim 1, wherein the other surface region is provided with a glazed layer.

9. A method for preparing a glass-ceramic dental prosthesis of claim 8, comprising:

performing a glazing treatment on a preform of a glass-ceramic dental prosthesis, and forming a glazed layer in an other surface region;

chemically reinforcing the prepared preform to form a metal ion-reinforced surface.

* * * * *